United States Patent [19]

Hüttlin

[11] Patent Number: 5,178,652
[45] Date of Patent: Jan. 12, 1993

[54] METHOD AND APPARATUS FOR GUIDING PROCESS GAS IN A FILTER

[76] Inventor: Herbert Hüttlin, Daimlerstr. 7, 7853 Steinen, Fed. Rep. of Germany

[21] Appl. No.: 757,925

[22] Filed: Sep. 12, 1991

[30] Foreign Application Priority Data

Sep. 21, 1990 [DE] Fed. Rep. of Germany ....... 4030086

[51] Int. Cl.⁵ ............................................. B01D 46/04
[52] U.S. Cl. ......................................... 55/96; 55/302; 55/341.1
[58] Field of Search .......................... 55/96, 302, 341.1

[56] References Cited

U.S. PATENT DOCUMENTS

| | | | |
|---|---|---|---|
| 3,473,300 | 10/1969 | Wilm et al. | 55/302 |
| 4,587,744 | 5/1986 | Huttlin | 34/57 R |
| 4,685,809 | 8/1987 | Huttlin | 366/101 |

FOREIGN PATENT DOCUMENTS

| | | |
|---|---|---|
| 80754 | 6/1983 | European Pat. Off. . |
| 0103894 | 1/1986 | European Pat. Off. . |
| 2232032 | 1/1973 | Fed. Rep. of Germany . |
| 3941321 | 6/1991 | Fed. Rep. of Germany . |

*Primary Examiner*—Bernard Nozick
*Attorney, Agent, or Firm*—Brumbaugh, Graves, Donohue & Raymond

[57] ABSTRACT

In a fluidized bed apparatus a process gas flows through a process chamber (46) and subsequently through a filter group, including a total number of at least two filter cartridges (50), while a respective part of the number of filter cartridges (50) is blocked, in rotation, to the gas flow coming from the process chamber (46) and is passed instead in opposite direction by a purging gas. An overall quantity of process gas exceeding the gas demand in the process chamber (46) at the ratio of the partial number mentioned to the total number of filter cartridges (50) is supplied to the apparatus. The exceeding partial amount of process gas is branched off in the apparatus ahead of the process chamber (46), passed as purging gas through the partial number mentioned of filter cartridges (50), and subsequently discharged through the remaining number of filter cartridges (50) together with the residual quantity of process gas coming from the process chamber (46). In this manner dust can be removed from the process gas at low expenditure for energy and with little noise.

7 Claims, 3 Drawing Sheets

METHOD AND APPARATUS FOR GUIDING PROCESS GAS IN A FILTER

The invention relates to a method of guiding process gas which flows in an apparatus, especially a fluidized bed apparatus, flowing through a process chamber and subsequently through a filter group which includes a total number of at least two filter cartridges, while a respective part of the number of filter cartridges is blocked, in rotation, to the gas flow coming from the process chamber, being passed instead in opposite direction by a purging gas.

Such a method and an apparatus suitable for carrrying out the method are known from DE 22 32 032 A1. The apparatus comprises a vessel the upper part of which is separated by a partition so as to form a collecting chamber. The partition has a number of ports from each of which a filter cartridge is suspended that consists of a filter strainer and a filter bag pulled over the strainer. A hood is suspended from a bellows above each port in the collecting chamber. The interior of each bellows is connected to a pressurized gas pipe and communicates with the interior of the corresponding hood through a diaphragm type valve sirene.

When the pressurized gas pipe is shut off each of the hoods is in a position spaced above the corrresponding port so that process gas can flow through the respective filter cartridge and the port into the collecting chamber to be discharged from the same through a gas outlet. Compressed air is introduced in rotation into a single bellows or into a group of bellows. Hereby the bellows is expanded so that the hood attached to it comes to sit on the corresponding outlet, thus separating it from the collecting chamber. Consequently process air can no longer flow through the respective filter cartridge. Yet the diaphragm valve sirene and the associated hood permit compressed air to be introduced into the respective filter cartridge, whereby its filter bag is blown up. This is intended to remove dust which has collected on the outside of the filter bag.

Yet the desired cleaning effect is not always achieved with the known apparatus since the bellows will not expand as required unless the compressed air introduced is throttled very much in the diaphragm valve sirenes, i.e. cooled due to expansion. That causes such a loss of energy of the compressed air that it will not have enough purging power left. Besides, there is a risk that the dew point will be fallen short such that the filter bags become soaked with moisture from inside, making the accumulated dust stick all the more firmly to their outside. This in turn increases the loss of flow which the process gas suffers in the filter group. Furthermore, the use of compressed air for cleaning the filters requires a remarkable amount of energy to be spent and generates condiserable noise.

It is, therefore, an object of the invention to free dust-loaded process gas from dust with less consumption of energy and less generation of noise.

Starting from a method of the type recited initially, the object is met, in accordance with the invention, in that an overall quantity of process gas exceeding the gas demand in the process chamber at the ratio of the partial number mentioned to the total number of filter cartridges is supplied to the apparatus, in that the excess part quantity of process gas is branched off in the apparatus ahead of the process chamber, passed as purging gas through the partial number mentioned of filter catridges, and subsequently discharged through the remaining number of filter cartridges together with the residual quantity of process gas coming from the process chamber.

Thus, according to the invention the same part quantity of process gas per unit time is used to clean a partial number of filter cartridges as would flow through this partial number of filter cartridges during normal operation. The only difference, as compared to normal operation, is that fresh process gas flows through the partial number in question of filter cartridges, and that this gas flows in opposite direction. In this manner neither the work of the remaining number of filter cartridges nor the process properly taking place in the process chamber, such as a fluidized bed process, is disturbed in a manner worth mentioning by the cleaning of a partial number of filter cartridges.

The invention also relates to an apparatus, especially a fluidized bed apparatus for carrying out the method specified, comprising a vessel which has a gas inlet and a gas outlet and includes a process chamber connected through a central tube to the gas inlet, a collecting chamber, and a filter group including a plurality of filter cartridges disposed between said chambers. Such an apparatus is known from EP 01 03 894 B1.

Inasmuch as it relates to an apparatus and starting from an apparatus of the type defined above, the object of the invention set out above is met in that the collecting chamber is arranged between the process chamber and a distributing chamber which comprises the gas inlet, communicates with the process chamber through the central tube, and is adapted to be connected, in rotation, to the filter cartridges through a double valve assembly each adapted to be returned subsequently into an inoperative position in which it permits gas to flow from the associated filter cartridge into the collecting chamber which, however, it separates from the distributing chamber.

An embodiment of the invention will be described in greater detail below with reference to diagrammatic drawings, in which.

Figure 1:
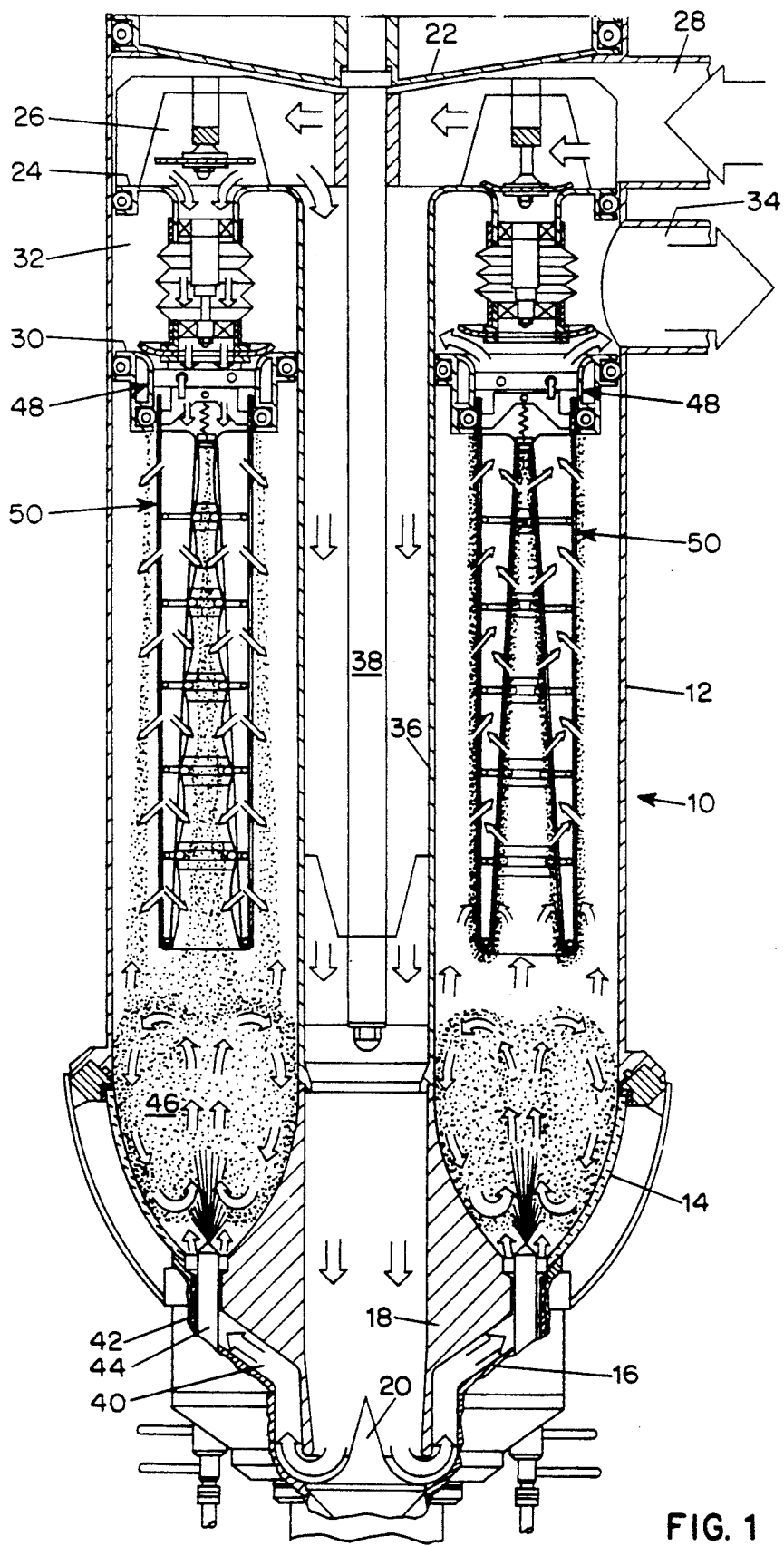
FIG. 1 is a vertical axial section through a fluidized bed apparatus according to the invention.

The apparatus shown comprises a vessel 10 which has a cylindrical portion 12, a spherical portion 14 underneath it, and a dish-like deflecting portion 16 underneath the spherical portion. The interior of the spherical portion 14 and of the deflecting portion 16 of the vessel is filled in part by a hollow core member 18 which is rotationally symmetric and into which a substantially conical closure member 20 projects from below.

At its top, the vessel 10 is closed by a lid 22, and a distributing chamber 26 provided with a gas inlet 28 is formed between the lid and an upper partition 24 arranged underneath the lid. Between the upper partition 24 and a lower partition 30 the vessel 10 further includes a collecting chamber 32 provided with a gas outlet 34. The distributing chamber 26 communicates at all times with the lowermost part of the vessel 10 through a central tube 36 which extends vertically down from the upper partition 24 and opens into the hollow core member 18. A tie bolt 38 clamps the upper partition 24 axially to the central tube 36 and thus to the lower partition 30.

Process gas flowing through the gas inlet 28 into the distributing chamber 26 and on in downward direction through the central tube 36 and the hollow core member 18 is deflected in upward direction by the closure member 20 and the deflecting portion 16, flowing through an annular expansion space 40 which is defined by a frustoconical inner surface of the deflecting portion 16 and a complementary outer surface of the core member 18. Subsequently the process gas flows through a cylindrical annular gap 42 in which dual or triple substance nozzles 44 are mounted vertically, thus reaching a process chamber 46 which is defined by the spherical portion 14 of the vessel, the core member 18, and the lower part of the cylindrical portion 12 of the vessel.

The lower partition 30 includes a plurality of ports 48 which are spaced uniformly around the central tube 36 and from each of which a filter cartridge 50 is suspended. The overall number of filter cartridges 50, for example, may be six. A respective partial number of at least one filter cartridge is blocked to the flow of spent process air which consequently reaches the collecting chamber 32 through the remaining number of a maximum of five filter cartridges 50 and the corresponding ports 48 and finally is discharged through the gas outlet 34.

Each filter cartridge 50 comprises a filter strainer 52 and a carrier ring 54 as well as a plurality of wire loops 56 extending downwards from the carrier ring 54 along a generatrix each of an imagined cylinder, being bent inwardly around a circular lower support ring 58, and then continuing along a generatrix each of an upwardly narrowing imagined cone, finally being bent radially outwardly toward the carrier ring 54 at which they are fastened. The outer parts of the wire loops 56 each arranged along the generatrix of a cylinder are interconnected by additional support rings 58 which are attached to them from the inside.

Each filter cartridge 50 further comprises a filter hose 60 including a cylindrical outer portion 62 and a conical inner portion 64. The cylindrical portion 62 of the filter hose 60 presents an outer covering of the filter strainer 52, while the conical portion 64 constitutes an inner lining thereof. Reinforcing rings 66 are sewn into the conical portion 64. The cylindrical portion 62 is clamped at its top to the carrier ring 54; the conical portion 64 has a closed upper end 68 which is suspended by a spring 70 from a yoke 72 of the filter strainer 52, which yoke 72 is fastened diametrically in the support ring 58.

Two pins 74 bent into hook shape are fastened symmetrically with respect to each other in the yoke 72. They are each fastened, by rotation of the filter cartridge 50 about its axis A, in a hole 76 formed in a link 78 which extends diametrically across the corresponding port 48 and is attached to the lower partition 30. Each filter cartridge 50 is clamped tightly in the corresponding port 48 by means of an annular seal 80 embedded in the port and adapted to be blown up.

A dual or double valve assembly consisting of the following components is associated with each filter cartridge 50: An annular valve seat 82 is formed in the lower partition 30 at the upper edge of each port 48. An elastic sealing member 84 of the shape of an annular disc at the lower end of a piece of tube 86 is coordinated with each seat. Each piece of tube 86 is suspended from the upper partition 24 by a displacement unit 88, such as a pneumatic piston and cylinder unit, and is connected by a bellows 92 to a passage 90 formed in the upper partition.

An annular valve seat 94 is formed also at the upper edge of each passage 90 through the upper partition 24. It is adapted to be closed by an elastic disc-shaped sealing member 98 by operation of a displacement unit 96, such as another pneumatic piston and cylinder unit. The opening lift or stroke of each displacement unit 96 is adjustable, such as by a knurled nut 100. The displacement units 88 and 96 are controlled in such manner that, with a total of six filter cartridges 50, at least one filter cartridge, and three at most, is/are cleaned at any one time, while the remaining minimum of three and maximum of five filter cartridges 50 are passed by the spent process gas. During normal filtering operation of a filter cartridge 50, as illustrated in the right half of FIGS. 1 and 2, the respective lower sealing member 84 is lifted off its valve seat 82 so that filtered process air can flow unobstructedly from the corresponding filter cartridge 50 into the collecting chamber 32. The associated upper sealing member 98, on the other hand, rests on its valve seat 94, thereby excluding any shortcircuit flow of fresh process gas from the distributing chamber 26 into the collecting chamber 32.

Figure 2:
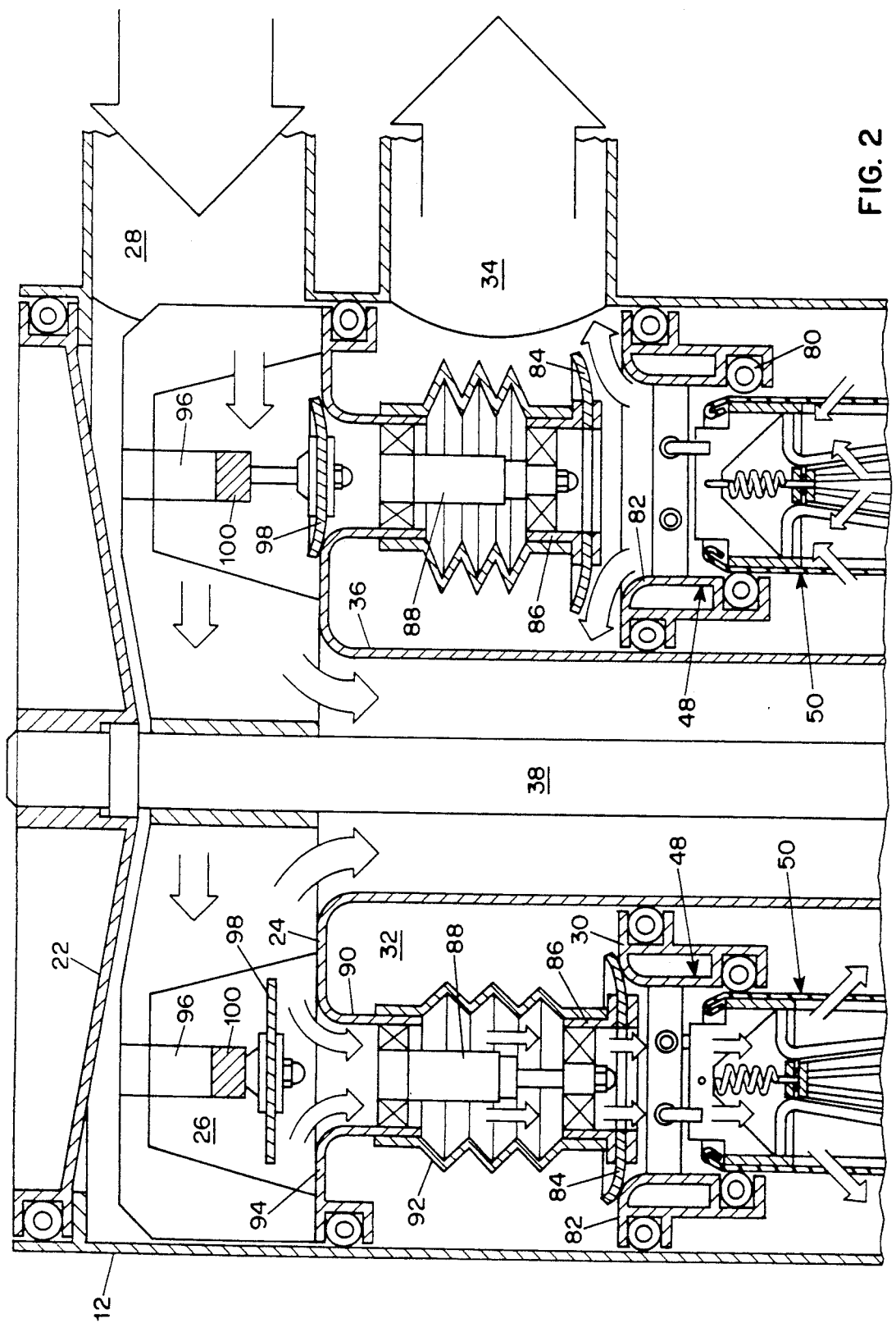
FIG. 2 is an enlarged cutout of the upper part of FIG. 1.
Figure 3:
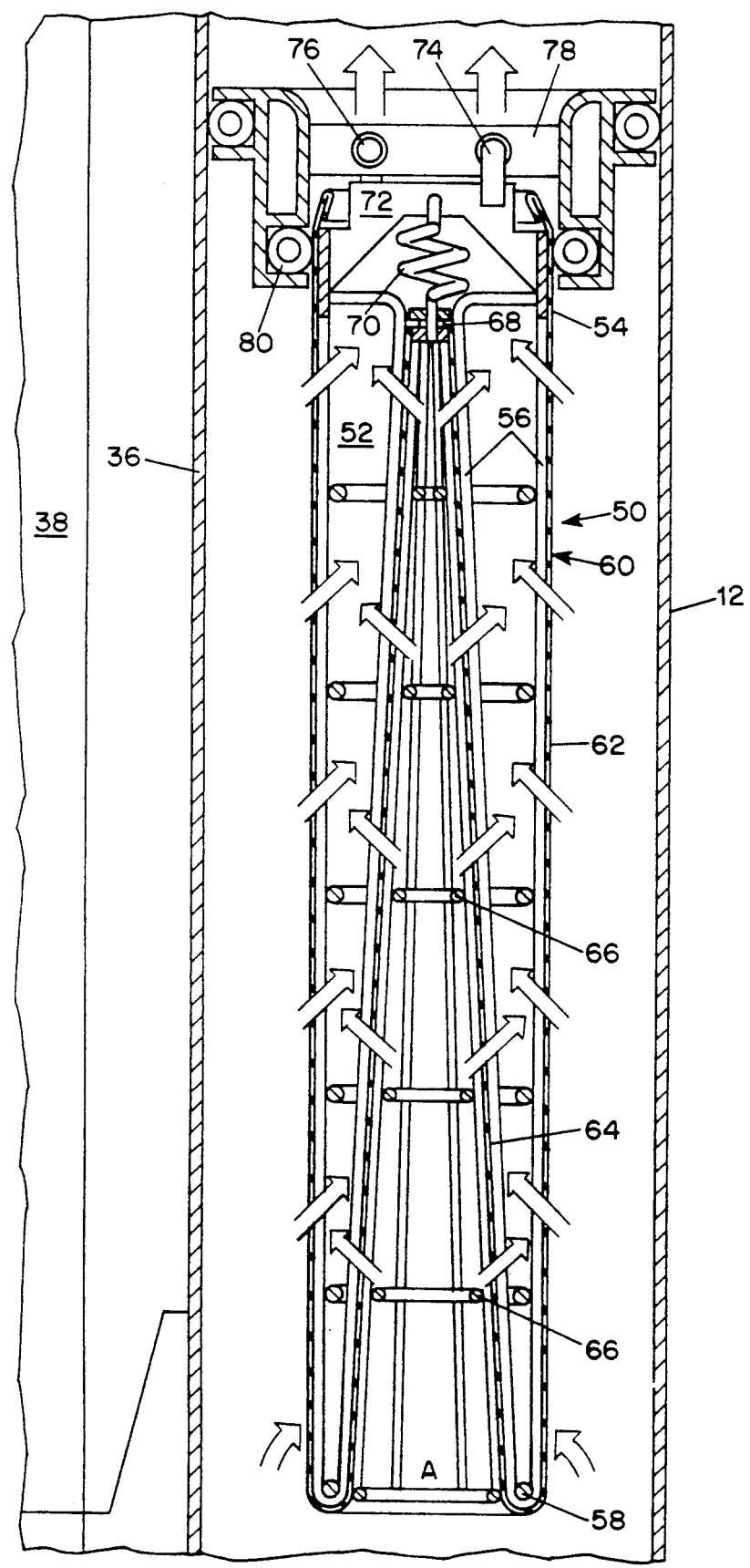
FIG. 3 is an enlarged cutout of the central part of FIG. 1.

The left half of FIGS. 1 and 2 illustrates the respective double valve asssembly in the position provided for cleaning of the filter cartridge 50. This position is obtained by the respective lower sealing member 84 first becoming seated on its valve seat 82 so as to separate the corresponding filter cartridge 50 from the collecting chamber 32. Subsequently the corresponding upper sealing member 98 is lifted off its valve seat 94 so that fresh process air can flow from the distributing chamber 26 into the respective filter cartridge 50. The filter hose 60 thereof is blown outwardly in its cylindrical portion 62 and radially inwardly in its conical portion 64 away from the wire loops 56, whereby any dust deposits adhering to the hose break off and fall down.

The dual valve assemblies shown may be modified such that only one annular sealing member 84 is available which effects sealing against the valve seat 82 when in its lower terminal position, as shown at the left in FIGS. 1 and 2, while it seals against a valve seat which may be formed, for instance, at a stationary part of the displacement unit 96, when in its upper terminal position. The upper sealing member 98 and its associated displacement unit 96 may be dispensed with in that event. Details of such a double valve assembly are illustrated and described in DE 39 41 321 A1 which is not a prior publication.

What is claimed is:

1. A method of guiding process gas which flows through a process chamber (46) and subsequently through a filter group which includes a total number of at least two filter cartridges (50), while a respective part of the number of filter cartridges (50) is blocked, in rotation, to the gas flow coming from the process chamber (46), being passed instead in opposite direction by a purging gas, characterized in that an overall quantity of process gas exceeding the gas demand in the process chamber (46) at the ratio of the partial number mentioned to the total number of filter cartridges (50) is supplied to the apparatus, in that the excess part quantity of process gas is branched off in the apparatus ahead of the process chamber (46), passed as purging gas through the partial number mentioned of filter cartridges (50), and subsequently discharged through the remaining number of filter cartridges (50) together with the residual quantity of process gas coming from the process chamber (46).

2. A method according to claim 1, wherein said process gas flows in a fluidized bed apparatus.

3. An apparatus comprising a vessel (10) which has a gas inlet (28) and a gas outlet (34) and includes a process chamber (46) connected through a central tube (36) to the gas inlet (28), a collecting chamber (32), and a filter group including a plurality of filter cartridges (50) disposed between said chambers (32, 46), characterized in that the collecting chamber (32) is arranged between the process chamber (46) and a distributing chamber (26) which comprises the gas inlet (28), communicates with the process chamber (46) through the central tube (36), and is adapted to be connected, in rotation, to the filter cartridges (50) through a double valve assembly each adapted to be returned subsequently into an inoperative position in which gas is permitted to flow from the associated filter cartridge (50) into the collecting chamber (32) separating process chamber (46) from the distributing chamber (26).

4. The apparatus as claimed in claim 3, characterized in that the distributing chamber (26) is defined with respect to the collecting chamber (32) by an upper partition (24) from which a piece of tube (86) is suspended so as to be adjustable in height above each filter cartridge (50), the collecting chamber (32) is defined with respect to the process chamber (46) by a lower partition (30) from which the filter cartridges (50) are suspended, and each double valve assembly comprises an upper valve seat (94) at the upper partition (24) and a lower valve seat (82) at the lower partition (30) and at least one sealing member (84, 98) which is movable up and down by a displacement unit (88, 96).

5. The apparatus as claimed in claim 4, characterized in that each of the valve seats (94, 82) has its own associated upper or lower sealing member (98, 84), respectively, which is movable up and down by a displacement unit (96, 88) of its own such that a direct stream of gas from the distributing chamber (26) through a double valve assembly into the collecting chamber (32) is impossible at all times.

6. The apparatus as claimed in claim 5, characterized in that the upper sealing member (98) of each double valve assembly is of adjustable opening lift.

7. An apparatus according to any one of claims 3-6, wherein said apparatus is a fluidized bed apparatus.

* * * * *

UNITED STATES PATENT AND TRADEMARK OFFICE
CERTIFICATE OF CORRECTION

PATENT NO. : 5,178,652

DATED : January 12, 1993

INVENTOR(S) : Herbert Hüttlin

It is certified that error appears in the above-identified patent and that said Letters Patent is hereby corrected as shown below:

Col. 1, line 56, "condiserable" should read --considerable--.

Col. 1, line 68 and col. 2, line 1, "catridges" should read --cartridges--.

Col. 2, following line 38, insert the following paragraph --Additional advantages of the apparatus according to the invention are presented in claims 3 to 5--.

Signed and Sealed this

Seventh Day of December, 1993

Attest:

BRUCE LEHMAN

Attesting Officer

Commissioner of Patents and Trademarks